United States Patent [19]

Culpepper et al.

[11] 4,021,807
[45] May 3, 1977

[54] BEACON TRACKING SYSTEM

[75] Inventors: Jerry W. Culpepper, Garland; Harry A. Currie, Farmers Branch; William F. Heathcock, Garland, all of Tex.

[73] Assignee: Texas Instruments Incorporated, Dallas, Tex.

[22] Filed: Apr. 2, 1975

[21] Appl. No.: 564,510

[52] U.S. Cl. .......................... 343/112 R; 325/111; 340/280; 343/113 R
[51] Int. Cl.² ..................... G01S 5/02; G08B 21/00
[58] Field of Search ....... 343/113 R, 112 R, 112 D; 325/111; 340/224, 280

[56] References Cited

UNITED STATES PATENTS

| | | | |
|---|---|---|---|
| 2,951,248 | 8/1960 | Goodell | 343/113 R |
| 2,995,751 | 8/1961 | Bosch | 343/113 R |
| 3,005,200 | 10/1961 | O'Meara | 343/113 R |
| 3,366,958 | 1/1968 | Seaborn | 343/112 D |
| 3,618,059 | 11/1971 | Allen | 325/111 |

OTHER PUBLICATIONS

Radio & Television, Jan. 1939, p. 522.

*Primary Examiner*—Maynard R. Wilbur
*Assistant Examiner*—Richard E. Berger
*Attorney, Agent, or Firm*—Harold Levine; René E. Grossman; Alva H. Bandy

[57] ABSTRACT

A radio frequency transmitter is hidden within a packet of currency which may be mingled with other currency packets in the cash drawer of a bank, convenience store or other such commercial institution. The transmitter is automatically activated by unauthorized removal from the cash drawer or other place of safekeeping. The signals from the transmitter activate alarms in one or more receivers located in police vehicles in the area. The receivers employ phase comparison techniques to indicate relative direction and distance to the transmitter thereby facilitating apprehension of the possessor of the packet.

4 Claims, 15 Drawing Figures

BEACON TRACKING SYSTEM

This invention relates to systems for tracking a remote radio frequency transmitter and in particular to a system for facilitating the apprehension of cirminals.

While the invention will be illustrated by a system for the apprehension of the perpetrators of a robbery, other applications of the invention will immediately suggest themselves. Such other applications, for example, include the location of victims of abduction, location and rescue of downed aircraft, and tracking of motor vehicles.

Present day security measures for the deterrence of theft include physical impediments to the unauthorized removal of property such as barred windows, massive doors, safes and armed guards. Other measures such as burglar alarms are designed to announce to police the occurrence and location of a theft. Still other measures such as gas bomb money packets, marked money, ultra-violet person marking, and closed circuit TV are designed to mark or identify thieves for later tracing, arrest and conviction. The system of the present invention may be used to replace, or in connection with, these other measures to facilitate and improve the deterrence of crime and the apprehension of criminals.

Briefly, the system comprises a radio frequency transmitter which is secreted in a packet of currency. The packet may comprise a packet of real currency which has been modified so as to provide an interior recess wherein is located the transmitter. Alternatively, the packet may comprise simulated currency similarly configured so as to provide an internal recess for the transmitter. In other cases it may be preferable to combine real currency with simulated currency to make up the packet. for the purposes of this disclosure and the claims appended hereto the term "bogus packet of currency" shall have reference to any of the aforementioned or similar arrangements for housing the clandestine transmitter.

The battery powered transmitter is energized through a switch which is in a normally open state when the currency packet is located in the currency drawer or other storage compartment. The act of removing the currency packet from the storage location causes this switch to close, thereby energizing the transmitter to transmit at a predetermined radio frequency. In the preferred embodiment this transmission is amplitude modulated so as to facilitate identification by associated receiving equipment. The system also comprises a beacon tracking receiver which may be adapted for installation either in police vehicles or in fixed police installations. The beacon tracking receiver comprises a receiver section and a display section. In the preferred embodiment the receiver section employs two antennas which, in one application, may be mounted on the roof of a police cruiser. The receiver senses the phase difference between the signals picked up by the two antennas and utilizes this information to determine whether the transmitter is located to the left or to the right of the police vehicle. The signal picked up by a third antenna is used in conjunction with that picked up by one of the first two antennas for the purpose of determining whether the transmitter is located ahead of or behind the police vehicle.

This directional information is visually displayed by means of a panel meter which comprises a portion of the display unit. In the mobile vehicle application this display unit is conveniently adapted to be mounted on the dash of the police cruiser. The display system includes a second panel meter which responds to the RF signals detected by the receiver to indicate the relative distance of the transmitter. An audible tone signal is also provided to indicate to the vehicle operator when a transmitter signal is being detected. The frequency of this signal is variable and indicative of the relative proximity of the transmitter. The audible tone signal is amplitude modulated when the angle between the vector to the transmitter and the fore/aft axis of the vehicle exceeds a preselected angle. The combination audible/visual display allows the driver to minimize eye contact with the display unit and to track by ear so as not to interfere with his operation of the vehicle.

It is therefore an object of the invention to provide a system including a portable transmitter and means for locating the portable transmitter.

It is another object of the invention to provide a system for learning of the unauthorized removal of an article and for locating the article after its removal.

It is a further object of the invention to provide a burglar apprehension system comprising a radio frequency transmitter secreted in a bogus currency packet and means for tracking the transmitter after removal of the packet from its proper repository.

Other objects and features of the invention will be made obvious by a consideration of the following detailed description in connection with the drawings wherein.

Figure 1:
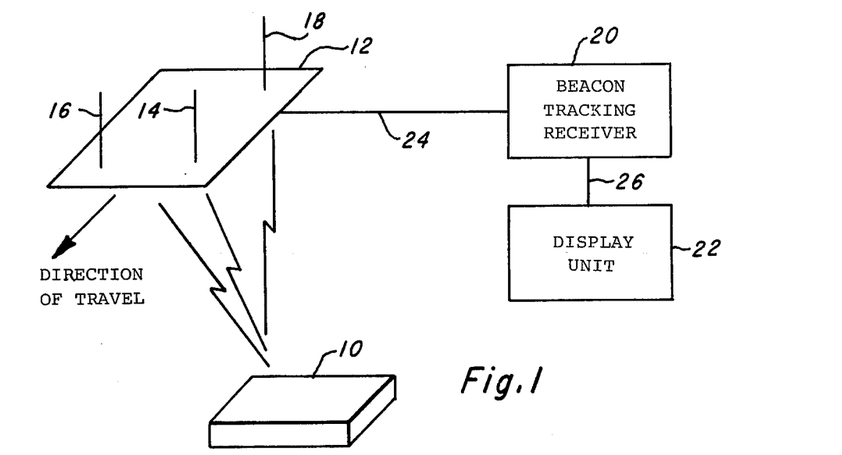
FIG. 1 is a diagram showing the elements of the beacon tracking system.

With reference to FIG. 1 there are shown, in symbolic form, the elements of the beacon tracking system as they appear in the preferred embodiment. A bogus currency packet 10 which has been removed from its proper repository contains a radio frequency transmitter which, as a result of the unauthorized removal, is in a transmitting mode. A ground plane 12, which may comprise the roof of a police cruiser, supports three RF receiving antennas 14, 16 and 18. Antennas 14, 16 and 18 are selected to be efficient receivers at the frequency transmitted by bogus currency packet 10. Antennas 14 and 16 are located along a line which is perpendicular to the direction of travel of the police cruiser while antennas 14 and 18 are located along a line which is parallel to the direction of travel. In the preferred embodiment the separation between antennas 14 and 16 and between antennas 14 and 18 is approximately one half wavelength at the frequency transmitted by bogus currency packet 10. A beacon tracking reveiver 20 and its associated display unit 22 may generally be located inside the police cruiser. As indicated symbolically by line 24, the electrical signals received by antennas 14, 16 and 18 are coupled to beacon tracking receiver 20 while receiver 20 is electrically connected to display unit 22 as indicated by line 26.

Operationally it will be seen that when the transmitter is directly in front of or behind the police crusier, the electrical signals received by antennas 14, and 16 will be in phase. If, however, the crusier is oriented such that bogus currency packet 10 is located to the left of the cruiser's fore/aft axis, then the phase of the signal received by antenna 16 will lag that of the signal received by antenna 14. In a similar manner the signals received by antennas 14 and 18 will be in phase when the transmitter is directly abreast of the cruiser but will be out of phase at those times when the transmitter is either ahead of or behind the lateral axis of the cruiser. The signals received by the three antennas are processed in beacon tracking receiver 20 so as to provide, through display unit 22, a visual and audible indication of the relative direction of the bogus currency packet 10.

Figure 2:
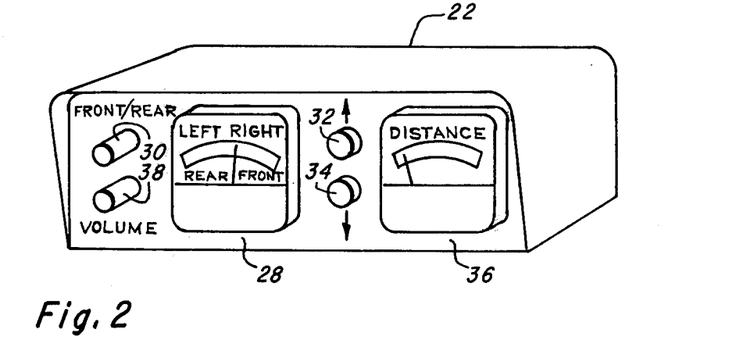
FIG. 2 shows a perspective view of the display unit.

The external configuration of display unit 22 is illustrated in FIG. 2. The unit is located in a case which is adapted to be conveniently mounted on the dash of the police cruiser. A front panel meter 28 is responsive to the signals received by antennas 14 and 16 after processing in beacon tracking reveiver 20 to provide a visual indication as to whether the bogus currency packet 10 is left or right of the front/rear axis of the crusier. Alternatively, when front/rear switch 30 is depressed, front panel meter 28 is responsive to the signals received by antennas 14 and 18, after processing by beacon tracking receiver 20, to show the location of bogus currency packet 10 relative to the lateral axis of the cruiser. Also, when front/rear switch 30 is depressed, either front or rear light 32 or 34 will be illuminated to provide an alternative display of the location of bogus currency packet 10 relative to the cruiser lateral axis. The amplitude of the signals received by the antennas is employed by beacon tracking receiver 20 to provide a visual indication of the range to the bogus currency packet 10 on front panel distance meter 36.

While not shown expressly in FIG. 2, display unit 22 also provides audible indications to the vehicle operator. When the antennas receive a signal with an amplitude exceeding preselected threshold, display unit 22 emits an audible tone signal which alerts the operator to the fact that a bogus currency packet is transmitting. The frequency of the audible tone signal is related to the strength of the signals received by the antennas so as to provide to the operator an audible indication of the relative range to the transmitting bogus currency packet 10. This audible tone is also amplitude modulated when the angle between the vector to the transmitter and the direction of travel of the police cruiser exceeds a preselected angle. In this way the operator is provided with an audible indication that a turn should be made. A volume control knob 38 on the front panel of the display unit 22 permits adjusting the volume of the audible tone signal for the convenience of the operator but cannot be completely turned off.

Figure 3A:
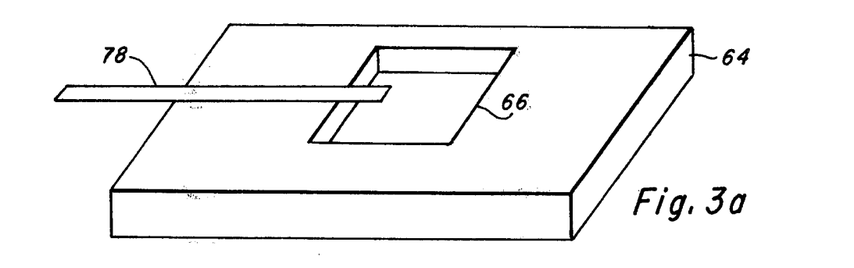
FIGS. 3a and 3b illustrate the internal configuration of a bogus currency packet.
Figure 3B:
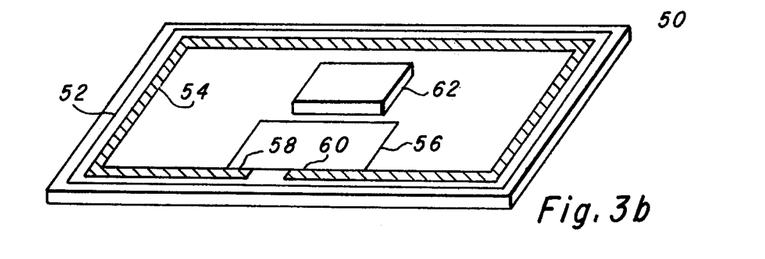

In FIGS. 3a and 3b there are illustrated perspective views of portions of a currency packet and of the transmitter which is secreted in the interior portion of the currency packet. In the preferred embodiment a portion of the bills from a conventional currency packet comprise the base member 50 of the structure on which is located a thin rectangular member 52 made of a polymide film of the type sold under the trademark KAPTON by E. I. duPont de Nemours Co. Member 52 has peripheral dimensions slightly smaller than those of a bill. Formed on member 52 is a copper etch segment 54 which comprises a loop antenna. Contact between antenna 54 and printed circuit board 56 is made in the general area of points 58 and 60. Printed circuit board 56 supports the electrical components which make up the transmitter circuit. Battery 62 provides the electrical energy for the transmitter. Battery 62 may be an 8.4 volt (6 cells) battery available from Mallory Battery Co.

The remainder of the conventional currency packet 64 is shown inverted in FIG. 3a so as to expose recess 66 which is formed by providing a rectangular opening in a portion of the bills comprising the remainder of the packet. Recess 66 is provided for the purpose of accomodating the components on printed cirucit board 56 as well as battery 62, thereby permitting the entire transmitter structure to be hidden internal to the currency packet.

Figure 4:
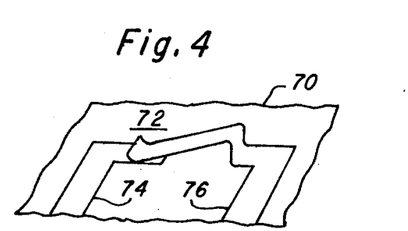
FIG. 4 shows one switch configuration used to energize the transmitter.

The transmitter, while located in the cash drawer, is decoupled from the battery and remains in a quiescent state. The act of removing the currency pack from the cash drawer activates the transmitter causing it to begin broadcasting at the predetermined frenquency. One means of activation is illustrated in FIG. 4 where is shown a portion 70 of the surface of printed circuit board 56. There is located on the printed circuit board a switch 72 comprised of electrically conductive segments 74 and 76. Segment 74 may be formed as a part of the overall metallization pattern of the printed circuit board. Segment 76 has a base portion which is affixed to the substrated material of the printed circuit board and a cantilevered portion which extends over and makes electrical contact with segment 74. The cantilevered portion of segment 76 constitutes a spring exerting firm mechanical pressure on underlying segment 74 so as to insure electrical contact at all times. The switch comprised of segments 74 and 76 is placed in the line coupling battery 62 to the transmitter. When the currency pack is in a cash drawer or other proper receptacle, switch 72 is held in an open position by means of insulating strip 78 which extends into recess 66 of the currency packet as shown in FIG. 3a. Insulating strip 78, which may be of a convenient material such as plastic film sold under the trademark MYLAR by E. I. duPont de Nemours Co. is located so that the portion strip the stip extending into recess 66 is located between conductive segment 74 and the cantilevered portion of conductive segment 76 thereby interrupting the continuous electrical path through switch 72. The portion of insulating strip 78 extending beyond the periphery of the currency pack is mechanically attached to the cash drawer by means of tape or other suitable means for affixation. In this way, conductive strip 78 prevents the flow of current from battery 62 to the transmitter when the currency pack is in the cash drawer. When the currency pack is removed from the cash drawer, insulating strip 78 is withdrawn from the currency pack thereby permitting the contacts of switch 72 to close and electrically connect battery 62 to the transmitter.

Figure 5:
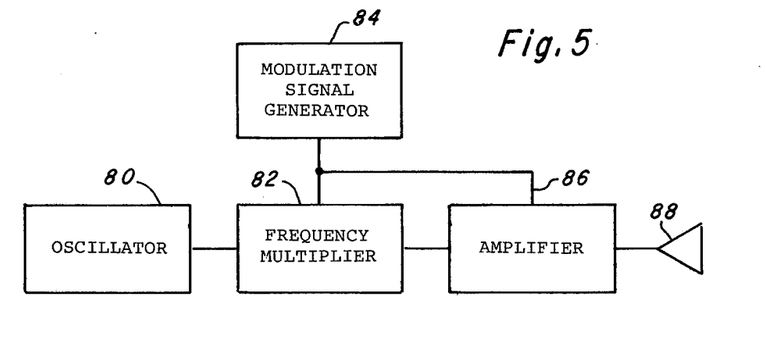
FIG. 5 is a block diagram of the transmitter.

FIG. 5 is a block diagram of the transmitter. Oscillator 80 is a crystal controlled oscillator operating at 115.667 mhz. The frequency of the output signal from oscillator 80 is tripled in frequency multiplier 82 so as to provide a 347 mhz CW signal. Modulation signal generator 84 provides a 570 hertz signal which is used to amplitude modulate the 347 mhz CW signal. The modulated CW signal is amplified by amplifier 86 and thence coupled to antenna 88 which is in the form of loop antenna 54 as seen in FIG. 3B.

Figure 6:
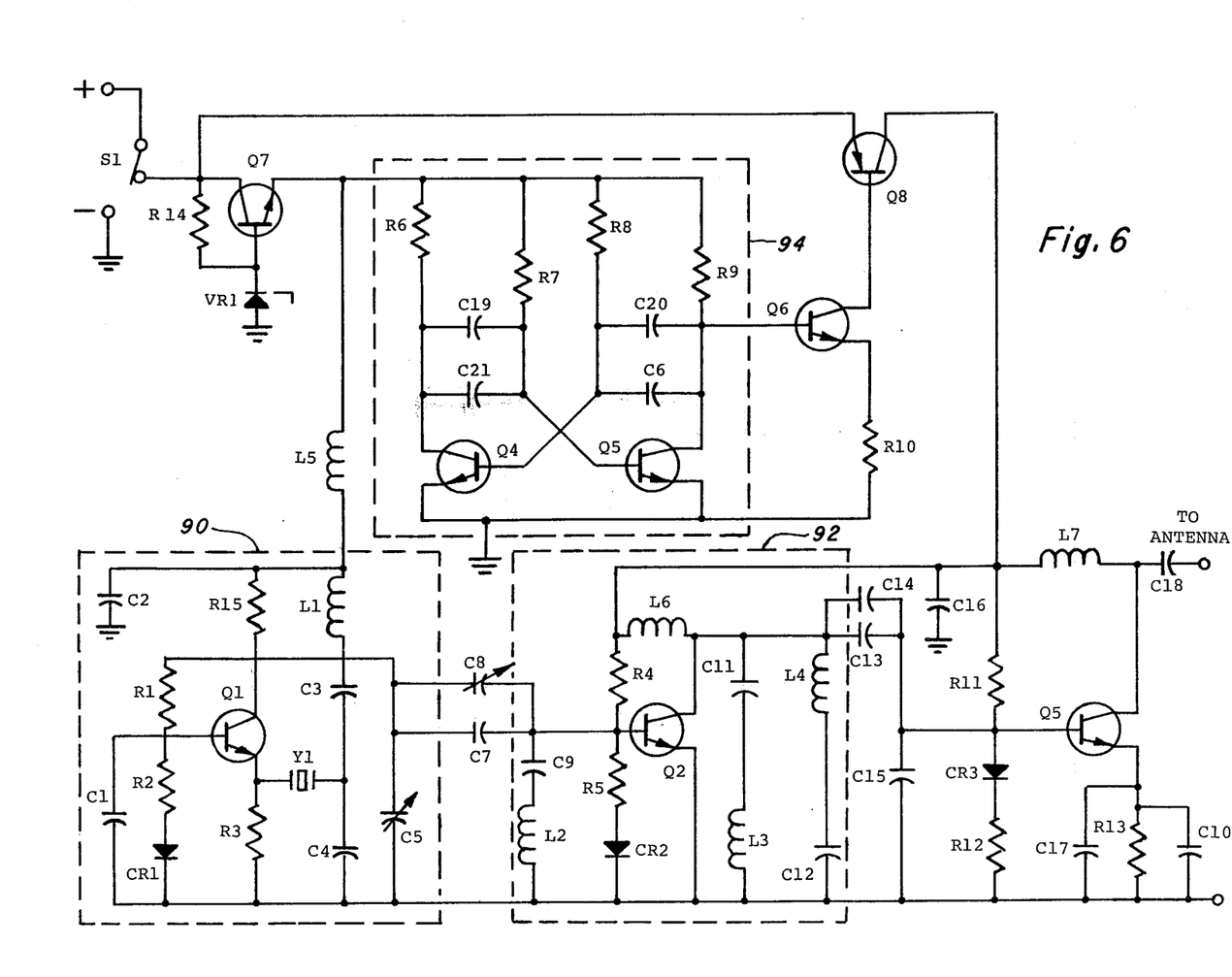
FIG. 6 is a schematic diagram of the transmitter.

A schematic diagram of the transmitter is shown in FIG. 6. The components included within dashed rectangle 90 comprise the crystal controlled oscillator 80 of FIG. 5. This will be recognized as a colpitts oscillator, modified by the inclusion of a crystal, Y1, between the emitter of transistor Q1 and the junction between capacitors C3 and C4. This crystal oscillator operates in a series resonant mode at a frequency of 115.667 mhz and establishes a frequency stability of ± 578 Hz (±5 ppm).

The components located within dashed rectangle 92 comprise frequency multiplier 82 of FIG. 5. The output signal from oscillator 80 is coupled to frequency 82 by a matching circuit comprising capacitors C7, C8, C9 and inductor L2. The matching circuit is tuned by properly adjusting variable capacitor C8. Frequency multiplier 82 is an amplifier which is driven by the output of oscillator 80 so as to operate in a substantially non-linear mode and thereby generate a substantial component at the third harmonic of the frequency produced by oscillator 80. The fundamental component appearing at the collector of transistor Q2, which is the largest single component other than the third harmonic component, is shunted to ground by the combination of capacitor C11 and inductor L3, this combination being series resonant at the fundamental frequency. Further filtering of the multiplied signal is provided by the filter comprised of capacitors C12–C15 and inductor L4. Transistor Q5 and its associated components comprise amplifier 86 of FIG. 5. This amplifier network increases the power level of the third harmonic component to a level suitable for transmission by the antenna (100–150mw).

In the schematic diagram of FIG. 6 switch S1 is normally open but is closed upon withdrawal of the currency packet from its designated receptacle thereby providing a positive voltage supply to the transmitter. Switch S1 may, for example, be switch 72 as shown in FIG. 4. The 8.4 volt battery voltage is reduced to a regulated voltage by the voltage regulator comprising transistor Q7, resistor R14 and regulator diode VR1. In the preferred embodiment regulator diode VR1 is a 5.1 volt zener diode which serves to set the regulated voltage appearing at the emitter of transistor Q7 at approximately 4.5 volts.

The components located within dashed rectangle 94 comprise modulation signal generator 84 of FIG. 5. This portion of the transmitter circuit is an astable multivibrator as is well known in the art. Fine tuning of the multivibrator to its frequency of 570 hertz is accomplished by selecting capacitors C20 and C21. The square wave output of the astable multivibrator drives a current switch composed of transistors Q6 and Q8.

When the output of the multivibrator is in the high state, both transistors Q6 and Q8 are turned on hard so as to provide substantially the battery voltage to that portion of the transmitter network including frequency multiplier 82 and amplifier 86. Alternatively, when the multivibrator output is in the low state transistors Q6 and Q8 are effectively turned off and the battery supply voltage is disconnected from the frequency multiplier and amplifier. Consequently, frequency multiplier 82 can operate to triple the oscillator output only during alternative half cycles of the waveform provided by modulation signal generator 84. This amounts to square wave amplitude modulation of the third harmonic frequency at the 570 hertz rate produced by the multivibrator. This amplitude modulation is useful in the yet to be described receiver circuit for the purpose of identifying the signal transmitted by the transmitter.

Figure 7:
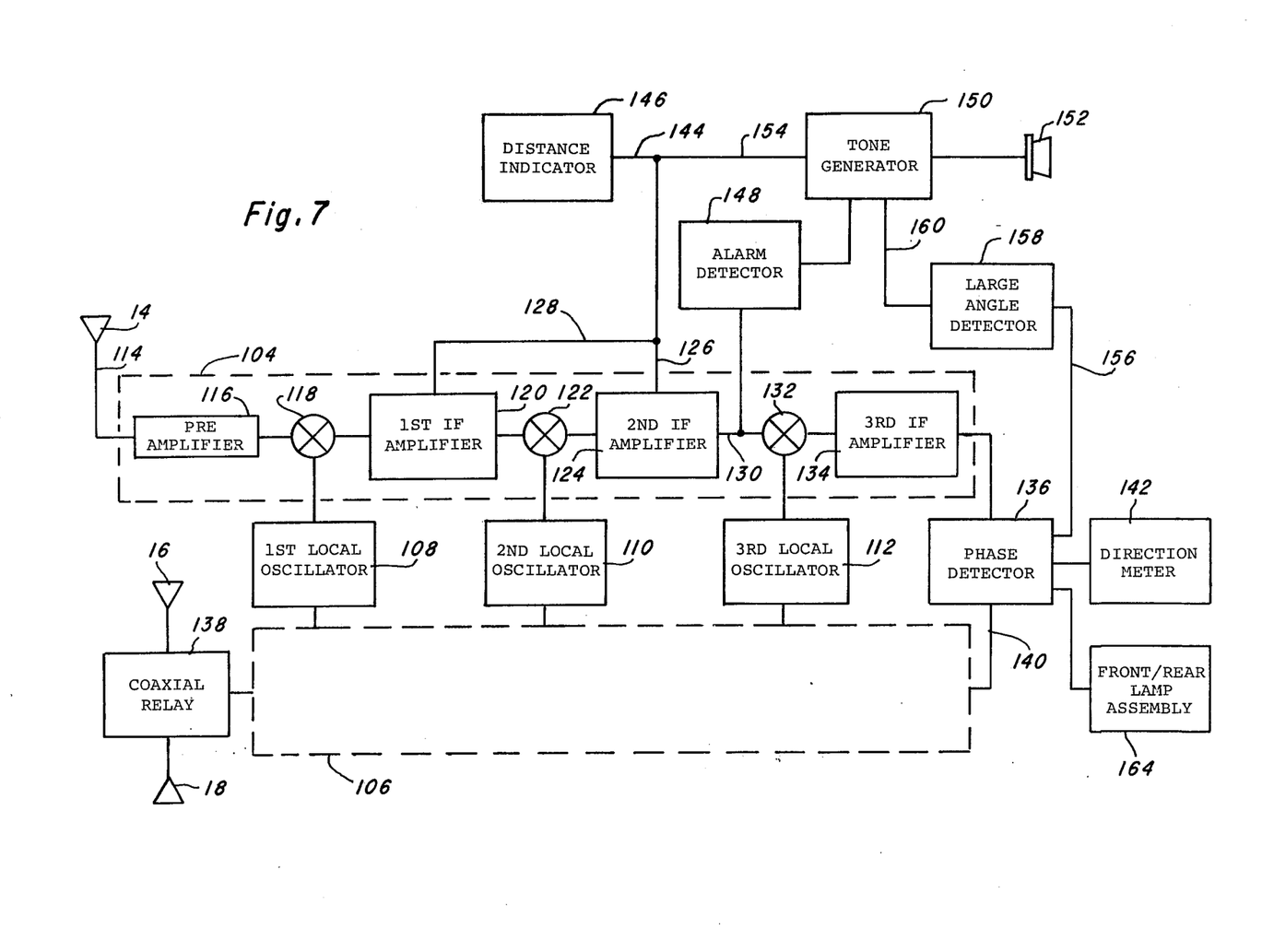
FIG. 7 is a block diagram of the beacon tracking receiver and display system.

FIG. 7 is a block diagram of the receiver and display system. In a first mode of operation the receiver monitors the signals appearing on right antenna 16 and left antenna 14 and utilizes the relative phases of these two signals to determine the direction to a transmitter relative to a receiver front/rear axis. The receiver comprises two identical triple conversion channels, one for each of the antenna signals. The triple conversion process is utilized to reduce the received frequency to a convenient low frequency for measurement of the phase difference between the signals. The triple conversion channel for the signal detected by antenna 14 comprises those elements located within dashed rectangle 104. The triple conversion channel for the signal detected by antenna 16 is represented by dashed rectangle 106 and includes elements identical to those shown expressly within rectangle 104. The local oscillator signals necessary to enable the triple conversion mixing are provided by first local oscillator 108 second local oscillator 110 and third oscillator 112. Each of these local oscillators provides a common signal to both of the triple conversion channels. In this way it is insured that the relative phases of the two signals are preserved during the triple conversion process. The frequencies provided by oscillators 108, 110 and 112 are respectively, 322.5 mhz, 24.045 mhz and 479 khz. With a transmitter frequency of 347 mhz, this results in IF frequencies of 24.5 mhz, 455 khz and 24 khz.

Considering in detail the elements comprising one of the triple conversion channels, the signal detected by antenna 14 is coupled by line 114 to preamplifier 116. The output of preamplifier 116 is combined in mixer 118 with the output of first local oscillator 108 to provide an intermediate frequency to first IF amplifier 120. The output of amplifier 120 is mixed in mixer 122 with the signal provided by second local oscillator 110 and coupled then to second IF amplifier 124. One output of second IF amplifier 124, appearing on line 126, is an AGC signal which, inter alia, is coupled by line 128 back to first IF amplifier 120. The use of AGC in amplifiers 120 and 124 permits the system to respond to a wide dynamic range of input signals. A second output from second IF amplifier 124 appearing on line 130 is combined in mixer 132 with the signal provided by third local oscillator 112 to provide an intermediate frequency signal for third IF amplifier 134. The output of amplifier 134 provides one of the inputs to phase detector 136.

The signal detected by antenna 16 is coupled by coaxial relay 138 to the second triple conversion channel represented by rectangle 106. Coaxial relay 138 may be a Model RFB-4502 unit manufactured by Hi-G Inc. of Windsor Locks, Ct. The output of the second triple conversion channel appearing on line 140 provides a second input to phase detector 136. Phase detector 136 compares the phases of the two signals and provides an output to direction meter 142 which is front panel meter 28 of FIG. 2.

The AGC signal provided by amplifier 124 is also coupled by line 144 to distance indicator 146 which represents front panel meter 36 of FIG. 2. When the transmitter whose signals are being detected by antenna 14 is in relatively close proximity to the receiver, the received signals will be relatively large thereby resulting in a strong AGC signal at the output of amplifier 124. This strong signal appearing on line 144 causes distance indicator 146 to read upscale and thereby indicate the near proximity of the transmitter. Conversely, a distant transmitter would result in a weak AGC signal on line 144 and consequently a down scale reading on distance indicator 146.

The output signal from amplifier 124 appearing on line 130 is coupled to alarm detector 148. Alarm detector 148 detects the presence or absence of a 570 hertz modulation on the output of amplifier 124 and, in the presence of such modulation, enables tone generator 150. Tone generator 150 in turn provides an audible frequency tone to speaker 152. It will be seen from the foregoing that speaker 152 will provide an audible tone only when alarm detector 148 senses the 570 hertz modulation which is employed in the transmitters forming a portion of the beacon tracking system. It will be noted that tone generator 150 is also responsive to the AGC output of amplifier 124, this output appearing on line 154. Tone generator 150 includes a voltage controlled oscillator having a variable frequency controlled by the level of the AGC signal appearing on line 154. As the level of this AGC signal increases, indicating a lessening distance between the receiver and the transmitter, the frequency provided by tone generator 150 increases. In this way, an operator is provided with an audible indication of the relative proximity of the transmitter as well as the visual indication provided by distance indicator 146.

It will further be noted that the output of phase detector 136 is coupled by line 156 to large angle detector 158. Large angle detector 158 provides a gating signal on line 160 at those times when the vector to the transmitter deviates from the front/rear axis of the receiver by more than a selectable threshold angle. This gating signal in turn gates the output of tone generator 150 alternatively on and off in a periodic fashion. The period of one on/off cycle is approximately ¼ to ½ second. As a result, the audible tone provided by speaker 152 is intermittent (beeps), thereby giving an operator an audible indication that a turn is required.

When front/rear switch 30 of FIG. 2 is depressed, coaxial relay 138 decouples right antenna 16 from the input of triple conversion channel 106 and couples rear antenna 18 to the input of channel 106. When operating in this mode, direction meter 142, responding to the output of phase detector 136, indicates to an operator the direction to a transmitter relative to a lateral axis of the receiver. At the same time front/rear lamp assembly 164 is activated to provide the operator with a second readily identifiable visual indication of the relative location of the transmitter. This feature resolves the 180° ambiguity present when only the left and right antennas are used.

With regard to the individual elements of the receiver, antennas 14, 16 and 18 my be ⅝ λ whip antennas. The spring base of each antenna is sufficiently stiff to prevent substantial deflection by the air stream passing the vehicle, but flexible enough to avert damage in car washes. The upper extremity of the antenna is extendible for fine tuning. In a police cruiser application the antennas may be mounted on the roof of the cruiser with the spacing between the right and left antenna and between the front and rear antenna approximately ½ wavelength or less at the carrier frequency of the transmitter.

Figure 8:
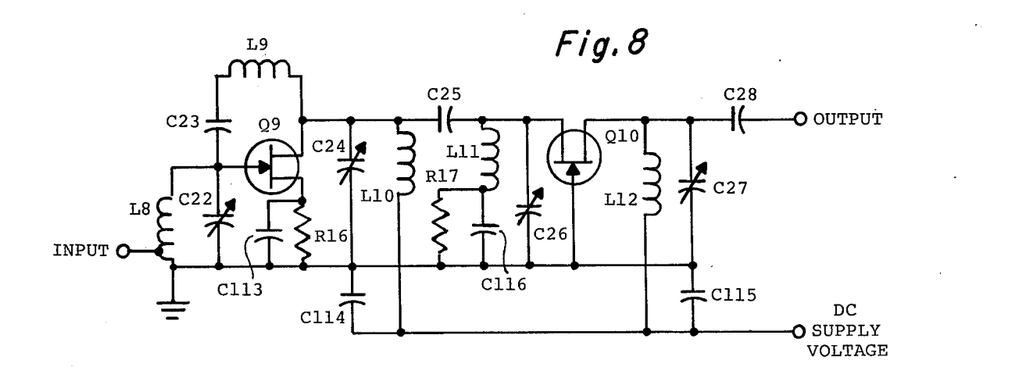
FIG. 8 is a schematic diagram of the preamplifier used in the receiver.

A schematic diagram of preamplifier 116 appears in FIG. 8. The preamplifier is a conventional two stage FET amplifier. The circuit provides approximately 26 dB of gain with a noise figure of approximately 1.5 dB and a bandwidth of approximately 4 mhz.

Figure 9:
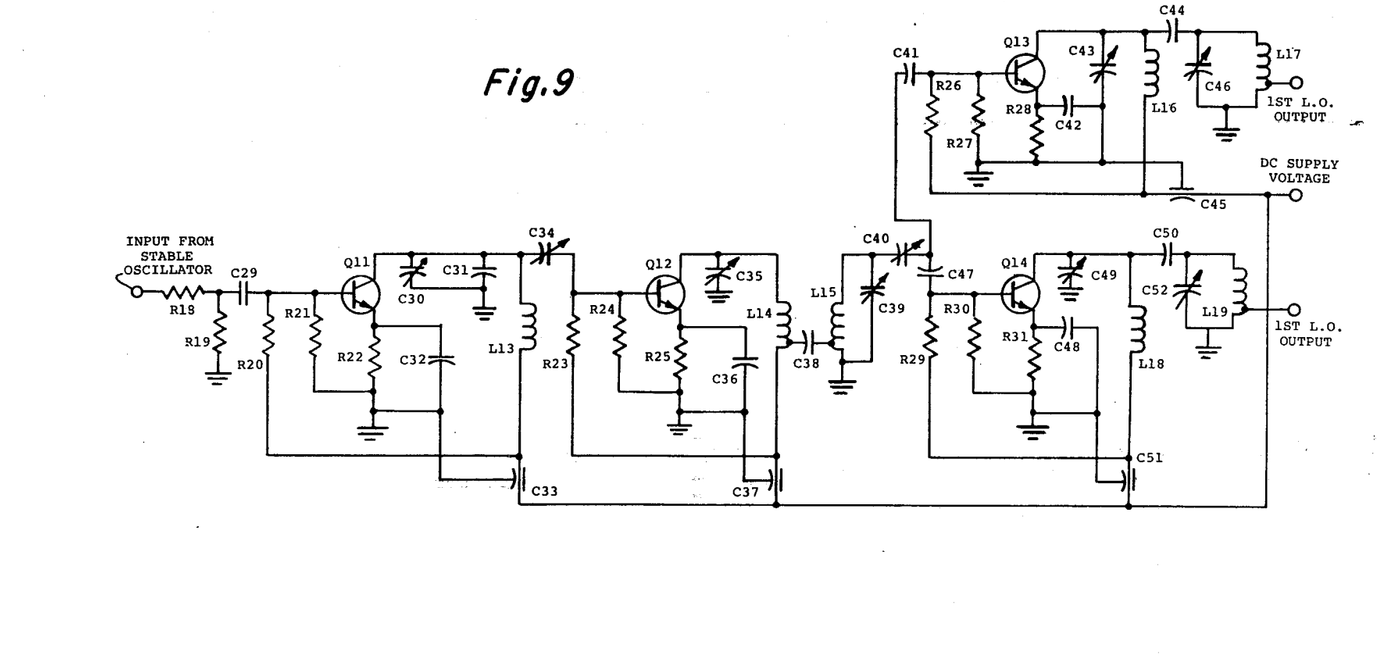
FIG. 9 is a schematic diagram of the first local oscillator.

First local oscillator 108 is illustrated in schematic form in FIG. 9. The input to resistor R18 labeled "input from stable oscillator" is a 107.5 mhz signal provided by an oven-stabilized crystal oscillator. In the preferred embodiment this oscillator has a frequency stability of better than ½ part per million over a temperature range of 0° to +50° C. A suitable oscillator is available from Ovenaire Incorporated of Charlottesville, Va. In FIG. 9 the stage including transistor Q11 is a buffer stage to provide isolation and impedance matching between the output of the oven-stabilized oscillator and the remainder of the first local oscillator circuit. The output signal from the buffer stage is of sufficient amplitude to drive the frequency multiplier stage including transistor Q12 so that a third harmonic component appears at the collector of transistor Q12. This third harmonic component is at the desired first local oscillator frequency, that is 322.5 mhz. The third harmonic component is further amplified in output stages including transistors Q13 and Q14. The signals produced by these two output stages are the first local oscillator output signals utilized in the triple conversion channels of the receiver. The signal coupled out of inductor L17, for example, is coupled to mixer 118 of FIG. 7.

Figure 10:
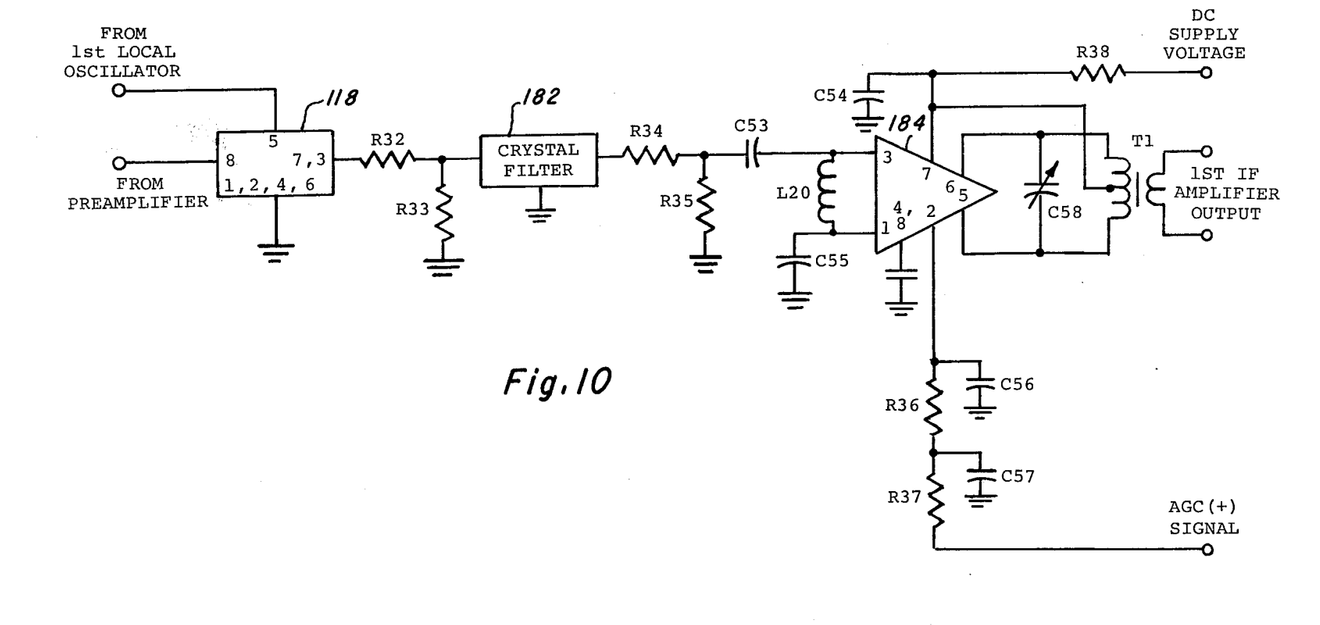
FIG. 10 is a schematic diagram of the first mixer and first IF amplifier.

Mixer 118 and first IF amplifier 120 are illustrated with greater detail in FIG. 10. For the purposes of clarity in this description, when the same component appears in more than one Figure it is assigned the same reference designator in each of the Figures. In the preferred embodiment mixer 118 is a double-balanced mixer Model MD108 manufactured by Anzac Electronics of Waltham, Mass. In FIG. 10 the numbers within the box designating mixer 118 indicate the proper external connections for the eight terminals of the MD108 mixer.

The 24.5 mhz output signal from mixer 118 is bandpass filtered in crystal filter 182. This component is readily available commercially and requires no further discussion here. The filtered mixer output is amplified in amplifier 184. A suitable amplifier for this purpose is a Model MC1590G high frequency amplifier manufactured by Motorola Inc. of Phoenix, Ariz. The terminal labeled "AGC (+) signal" is connected to line 128 of FIG. 7 to receive the AGC signal generated in second IF amplifier 124.

Figure 11:
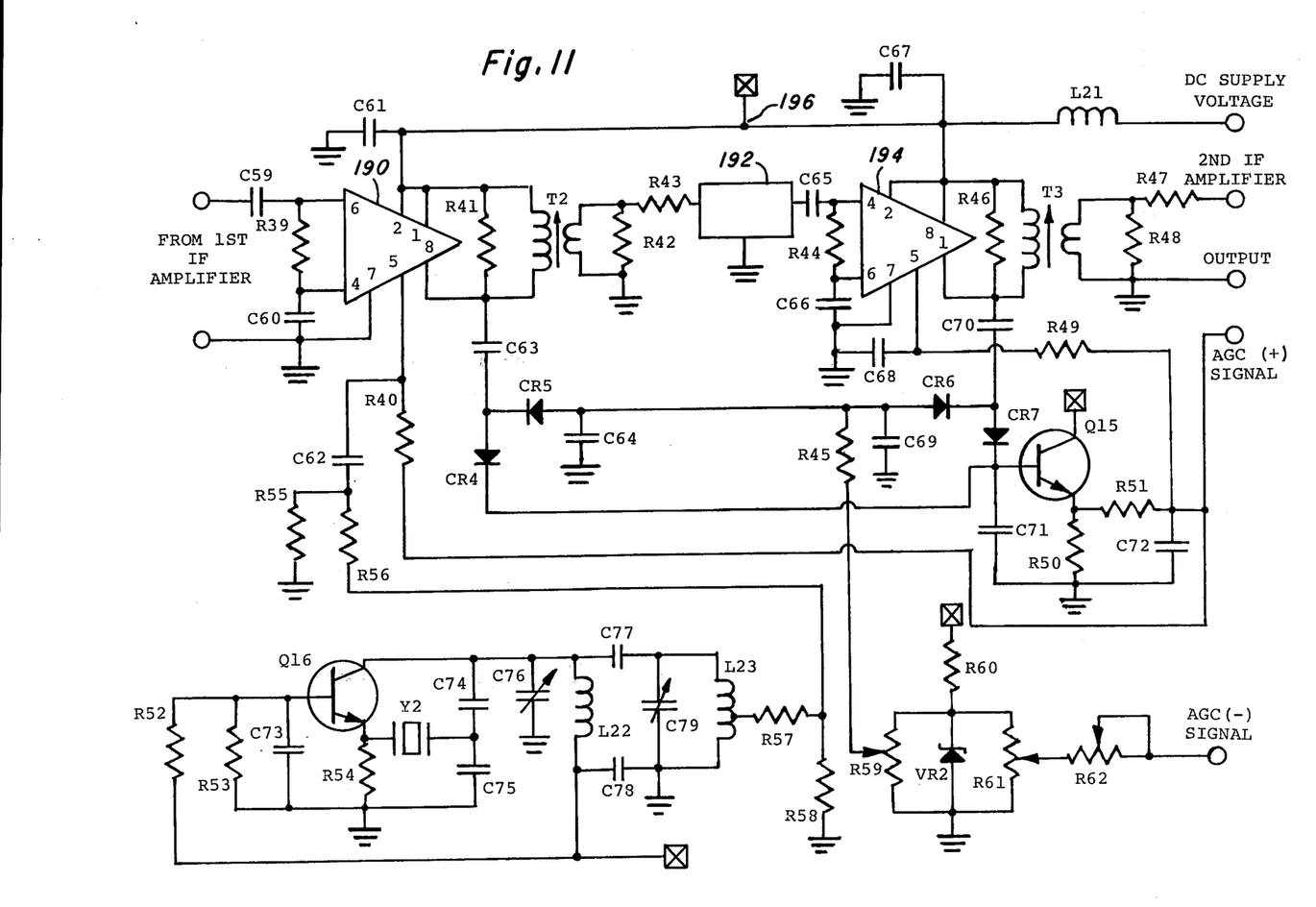
FIG. 11 is a schematic diagram showing the second local oscillator, mixer and IF amplifier.

Second local oscillator 110, mixer 122, and second IF amplifier 124 are shown in schematic form in FIG. 11. The second local oscillator is comprised of transistor Q16 and its associated components. Crystal Y2 functions as a series resonant circuit at its resonant frequency of 24.045 mhz. At this frequency, therefore, the emitter of transistor Q16 has a low impedance feedback path to the junction point between capacitors C74 and C75 and the circuit functions essentially as a classical colpitts oscillator. In FIG. 11 the second local oscillator provides a signal to the second IF amplifier for one channel of the triple conversion receiver. While not shown expressly, it will be recalled that the oscillator also provides a signal to the second IF amplifier in the second channel of the triple conversion receiver. Second IF amplifier 124 includes two stages of amplification, these being provided by integrated circuit IF amplifiers 190 and 194. Both integrated circuit IF amplifiers 190 and 194 may be a Model MC1350 IF amplifier manufactured by Motorola Inc. of Phoenix, Ariz. The double-ended output of amplifier 190 has a center frequency of 455 khz and is coupled by transformer T2 to IF bandpass filter 192. Bandpass filter 192 may be any of a wide variety of commercially available IF filters. The output of filter 192 is further amplified by IF amplifier 194 whose double-ended output is coupled by transformer T3 to the output terminals of the second IF amplifier. To avoid unnecessary complexity in the schematic diagram of FIG. 11, those points of the circuit which are electrically common with junction point 196 have all been indicated by a small rectangle enclosing a diagonal cross.

The 24.045 mhz second local oscillator signal is resistively coupled into the AGC terminal of amplifier 190, that is terminal 5. Amplifier 190, as well as forming a portion of second IF amplifier 124, also performs the function of mixer 122.

The AGC signal appearing on line 126 of FIG. 7 is generated in second IF amplifier 124. This AGC signal is dependent on the amplitude of the signal appearing at the output of amplifier 190, that is, terminal 8 and on the amplitude of the signal appearing at the output of amplifier 194, that is, terminal 1. Because of the narrow passband of filter 192, output noise from amplifier 190 may be of sufficient amplitude to saturate this amplifier while the filtered signal passing through 194 will not saturate the latter amplifier. In order to counter this condition the output of amplifier 190 generates an AGC signal to reduce the gain of the various amplifiers.

Considering the development of an AGC voltage at the output of amplifier 190, it will be noted that the combination of resistors R59 and R60 along with zener diode VR2 establishes a reference DC voltage at the non grounded side of capacitor C64. Capacitor C63 is a small coupling capacitor which serves to couple the signal from the output of amplifier 190 to the AGC circuit. Capacitor C64 is an RF bypass which serves to shunt signal currents to ground and thereby maintain a stable DC voltage at its ungrounded terminal. As a result, when the signal at terminal 8 of amplifier 190 swings negative the cathode of rectifier CR5 is clamped to a voltage approximately 0.6 volts below the stable DC reference voltage, 0.6 volts being the forward bias diode drop of rectifier CR5. It will be recognized by those skilled in the art, therefore, that the AGC detector functions as a peak-to-peak detector.

The AGC detector which is coupled to the output of amplifier 194 operates in an identical fashion so that large signals appearing at the output of either of amplifiers 190 or 194 will result in an AGC voltage appearing at the base of transistor Q15 and charging of capacitor C71. Transistor Q15 is an emitter follower which provides impedance matching into the lowpass filter comprised of resistor R51 and capacitor C72 and then to the AGC (+) signal terminal of the second IF amplifier. The signal appearing at this last mentioned terminal is coupled back to the AGC input of first IF amplifier 120. It will be noted that this same signal is coupled by resistor R40 back to the AGC input of amplifier 190 and by resistor R49 back to the AGC input amplifier 194. As seen in FIG. 7 this AGC signal is also coupled by line 144 to distance indicator 146 and by line 154 to tone generator 150.

Distance indicator 146 is a 1 milliampere full scale ammeter. This ammeter is not connected directly between the AGC (+) signal terminal and ground since the voltage at the AGC (+) signal terminal is non-zero even with no signal applied to the second IF amplifier. This zero signal AGC level is approximately three diode drops below the reference voltage established by the combination of resistors R59 and R60 and zener diode VR2. If the ammeter were so connected it would indicate a non-zero reading even under the zero signal condition. Proper operation is provided by the circuit of FIG. 11 where an AGC (−) signal is generated by the combination of variable resistances R16 and R62. The distance indicator ammeter is coupled between these two AGC signal terminals and variable resistances R61 and R62 are adjusted to provide a zero ammeter reading under zero signal conditions.

The face of the ammeter is modified so that the zero signal end of the meter scale is indicative of a distant transmitter while up-scale readings, reflective of an increasing level of AGC signal, are indicative of nearer transmitter locations. The face of distance meter 146, in addition to having numbers indicative of the approximate distance to the transmitter, is color coded in distance ranges to give a readily interpretable indication of distance to an operator.

Figure 12:
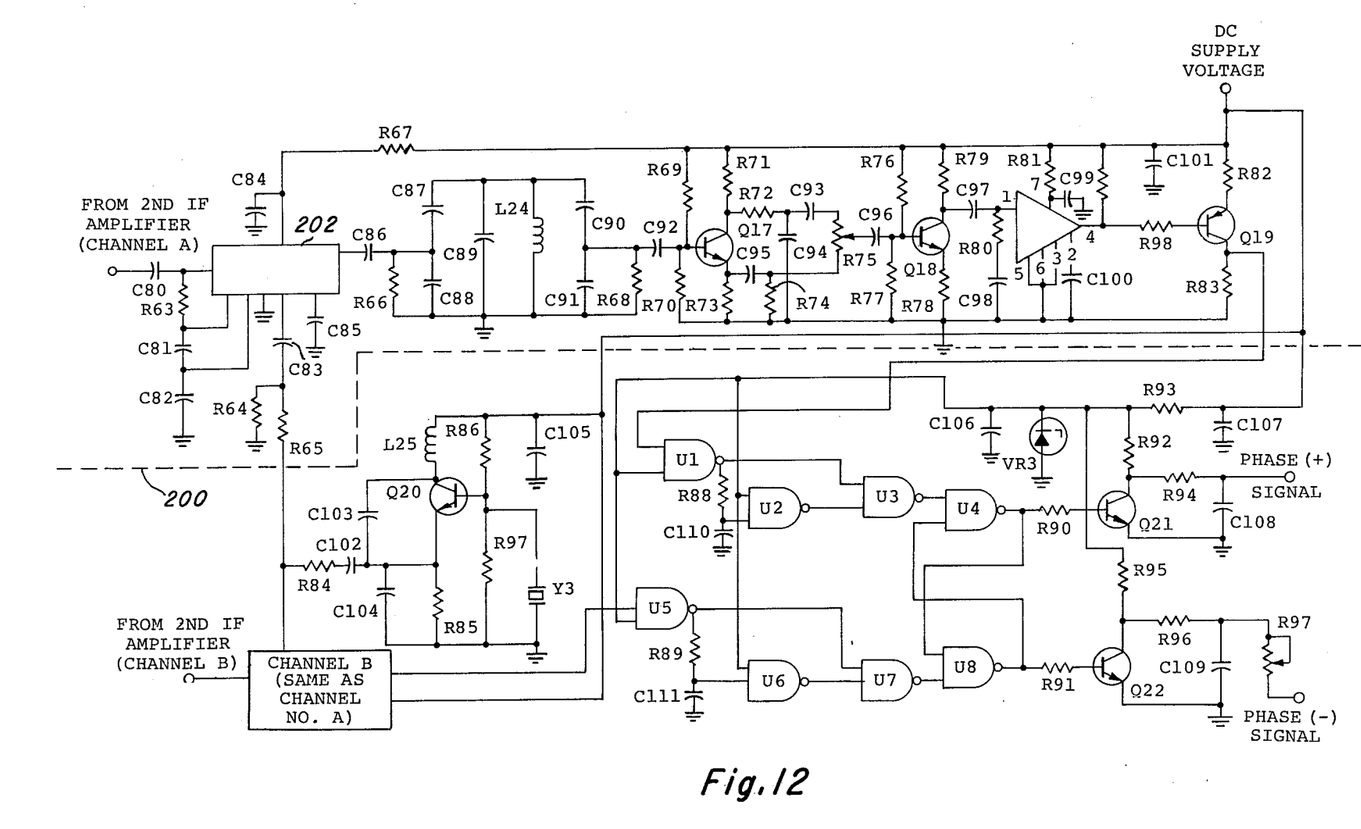
FIG. 12 is a schematic diagram showing the third local oscillator, mixer and IF amplifier, and the phase detector.

In FIG. 12 there is shown a schematic diagram which includes third local oscillator 112, mixer 132, third IF amplifier 134 and phase detector 136. In FIG. 12 those components lying above dashed line 200 comprise mixer 132 and third IF amplifier 134 for triple conversion channel A of the receiver. Rectangle 206 represents the corresponding components for triple conversion channel B of the receiver. Transistor Q20 and its associated components comprise the third local oscillator which operates at a frequency of 479 khz under the control of crystal Y3. Again, this circuit will be recognized as a crystal colpitts oscillator. The oscillator output is coupled to the AGC input of IF amplifier 202 which functions both as mixer 132 and as a portion of third IF amplifier 134. IF amplifier 202 may be similar to a Model SN76660 N integrated circuit manufactured by Texas Instruments Incorporated of Dallas, Tex. Alternatively, it may be similar to a Model TAA661 B integrated circuit manufactued by SGS-ATES Semiconductor Corporation of Newtonville, Mass. The output of amplifier 202 is coupled to a phase splitter which includes transistor Q17. The two outputs from the phase splitter are further phase shifted by the network comprising resistors R72 and R74 and capacitors C94 and C95. The two phase shifted signals are selectively combined by variable resistance R75 so as to provide, at the base of transistor Q18, a signal whose phase is variable with respect to the phase of the signal appearing at the base of transistor Q17. Transistor Q18 provides additional gain to this signal which is then hard limited by amplifier 204. Amplifier 204 may be similar to an RCA Model CA3076 integrated circuit. The hard limited signal is buffered by transistor Q19 and then coupled to NAND circuit U1 which comprises a first stage of phase detector 136.

Assuming that the receiver is receiving a signal at the transmitter frequency of 347 mhz, then because of the hard limiting in amplifier 204 the waveform appearing at the collector of transistor Q19 is a 24 khz square wave. This square wave is represented by waveform 210 in the waveform diagram of FIG. 13. It provides one input to NAND gate U1, the other input of which is coupled to a positive voltage supply. NAND gates U1 through U8 may each be a portion of a model SN 7400N quadruple NAND gate manufactured by Texas Instruments Incorporated of Dallas, Tex. The output of NAND gate U1 in response to waveform 210 is waveform 211. This signal provides one input to NAND gate U3. It is also low pass filtered by the combination of resistor R88 and capacitor C110 to provide one input to NAND gate U2, the other input of which is also referenced to the positive voltage supply. The low pass filtered waveform appearing at the junction between resistor R88 and capacitor C110 is represented by waveform 212. This waveform is an approximate replica of waveform 211 but is slightly delayed at its leading and trailing edges by the charging time of capacitor C110. As a result, the output of NAND gate U2, represented by waveform 213, is a square wave whose transition times lag slightly the transition times of waveform 211. Waveforms 211 and 213 are the inputs to NAND gate U3, the output of which is high at all times except for a brief interval following each negative going excursion of waveform 211, the output of NAND gate U3 being represented by waveform 214.

Figure 13:
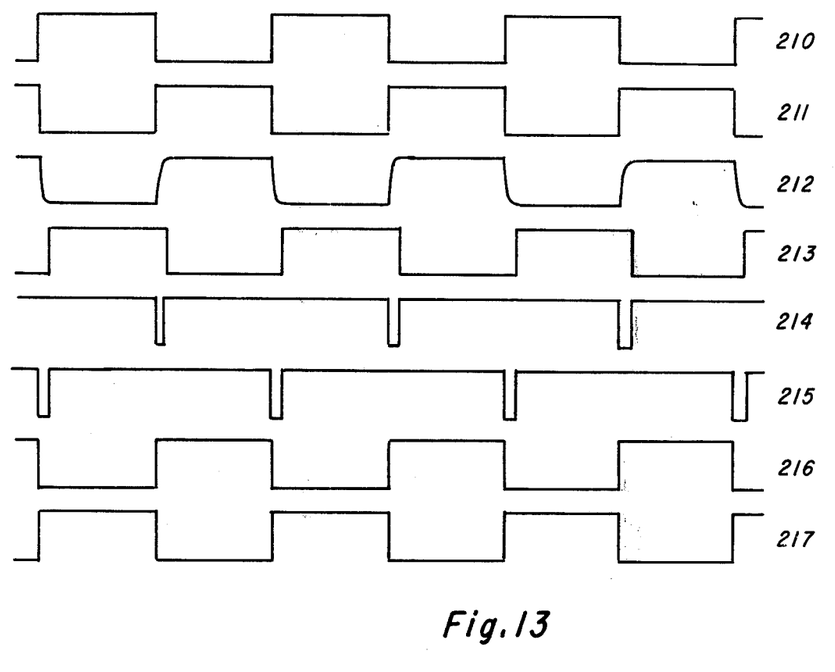
FIG. 13 shows waveforms illustrating the phase detector operation.

The waveform of FIG. 13 have been drawn for the situation when the signals received by the two active antennas are in phase. This is a situation which exists when the source of transmission lies on the perpendicular bisector of the line connecting the two active antennas. For this in phase mode of reception, the relative phases of the signals appearing at the collector of transistor Q19 and its counterpart in channel B are determined by the settings of variable resistor R75 and its counterpart in channel B. These variable resistors are set so that the signals appearing at the collectors of transistor Q19 and its counterpart in channel B are 180° out of phase when the two received signals are in phase. Under these circumstances the signal appearing at the output of NAND gate U7 and represented by waveform 215 is similar to the signal appearing at the output of NAND gate U3 but with its brief negative going excursions displaced in time from those of waveform 214. Under these conditions the outputs of the latch circuit comprised of NAND gates U4 and U8 are represented by waveforms 216 and 217, waveform 216 representing the output of NAND gate U4. For this condition, when the signals received by the two antennas are in phase, the outputs of this latch circuit are each symmetrical square waves and 180° out of phase with each other.

Waveforms 216 and 217 are each inverted by transistors Q21 and Q22 respectively. The output of transistor Q21 is low pass filtered by the combination of resistor R94 and capacitor C108 while the output of transistor Q22 is low pass filtered by the combination of resistor R96 and capacitor C109. Each of these low pass filters has an extremely long time constant so that the output labeled "phase (+) signal" is effectively a positive DC voltage, the level of which is proportional to the relative off times of the signal appearing at the output of NAND gate U4 and represented by waveform 216. For the situation depicted by FIG. 13, that is, when the two received signals are in phase, the DC levels appearing at the output terminals labeled phase (+) signal and phase (−) signal are equal since both waveforms 216 and 217 have equal on and off times. These two terminals are connected to opposite terminals of direction meter 142 of FIG. 7 which in the preferred embodiment is a 500-0-500 microampere ammeter. Under these circumstances direction meter 142 reads mid scale to indicate that the transmitter is either directly in line with the receiver or directly abreast of the receiver in accordance with whether the left/right or front/rear antennas are active. If, however, the signals received by the active antennas are not in phase, then the outputs of NAND gate U4 and U8 will become asymmetrical and the DC voltage at one of the phase detector outputs will increase while the DC voltage at the other phase detector output will decrease. The resultant non-zero voltage appearing across the terminals of direction meter 142 will cause the panel meter to indicate either upscale or downscale in accordance with the relative phases of the received signals.

Figure 14:
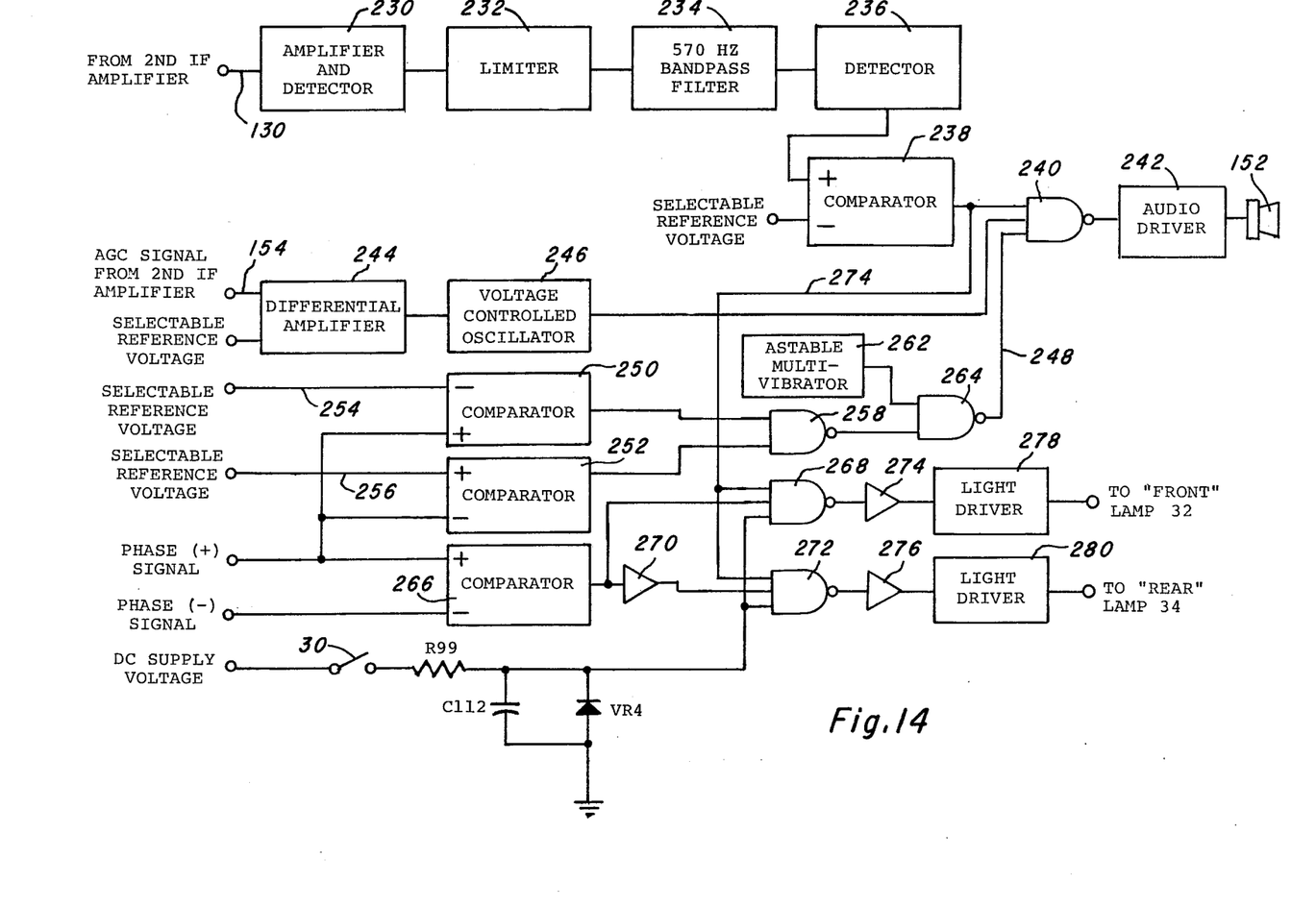
FIG. 14 is a block diagram of the display cirucits.

Portions of the display circuits which form part of the beacon tracking system are illustrated in FIG. 14. Since many of the elements of these circuits are well known in the art and in the interest of clarity of exposition, these circuits have been illustrated largely in block diagram form. The output signal from second IF amplifier 124, appearing on line 130 of FIG. 7, is coupled to amplifier and detector 230. This unit comprises a single stage amplifier coupled into a diode detector. The time constants of this diode detector are selected to permit it to follow a 570 hertz amplitude modulation envelope on the 455 khz carrier. The detected signal drives limiter 232 so as to provide an output signal which alternates between the upper and lower limits of the limiter. Limiter 232 as well as the various comparators appearing in FIG. 14 may each be similar to a model LM311N integrated circuit manufactured by National Semiconductor Corporation of Santa Clara, Calif. The output of limiter 232 is filtered by 570 hertz bandpass filter 234 which in the preferred embodiment comprises an operational amplifier with a 570 hertz notch filter in the feedback loop. The filtered signal is coupled to diode detector 236 which produces a positive DC voltage when a 570 hertz signal is present. This DC voltage, which is proportional to the amplitude of the 570 hertz signal, is matched in comparator 238 against a selectable reference voltage. When the DC voltage corresponding to the 570 hertz signal exceeds the selectable threshold voltage, the comparator produces a positive output voltage which gates audio signals through NAND gate 240 to audio driver 242. Audio driver 242 produces excitation at the required level to speaker 152. The display circuits described to this point permit excitation of speaker 152 only when the received signal is modulated at a 570 hertz rate and when the modulation level exceeds a selectable threshold. In this way the system rejects all signals other than those produced by the transmitter which forms a part of the beacon tracking system.

A second input to the display circuits of FIG. 14 is the AGC signal produced by second IF amplifier 124 and appearing on line 154 of FIG. 7. This AGC signal is matched against a selectable reference voltage in differential amplifier 244. The output of this amplifier, which is a DC voltage proportional to the difference between the AGC signal level and the selectable reference voltage, is used to control the frequency of voltage controlled oscillator 246. Voltage controlled oscillator 246 is a voltage controlled astable multivibrator of the type well known in the art. Its square wave output provides a second input to NAND gate 240 and has a frequency which varies within the audio range in accordance with the level of the AGC signal. As the AGC signal level increases, reflecting a stronger signal from a near transmitter, the frequency produced by the voltage controlled oscillator 246 increases proportionally. The specific range of frequencies to be covered is determined by the selectable reference voltage which forms one input to differential amplifier 244. Assuming for the moment that the logic level appearing on line 248 is high, then when the logic signal produced by comparator 238 is also high, the output of voltage control oscillator 246 is gated through NAND gate 240 into audio driver 242 to produce an audible tone in speaker 152. The frequency of this tone is directly indicative of the proximity of the transmitter.

The phase (+) signal produced by the phase detector circuit of FIG. 12 forms one of the inputs to each of comparators 250 and 252. This phase (+) signal will have some nominal DC level when the signals received by the two active antennas are in phase. Comparator 250 is also responsive to a selectable reference voltage appearing on line 254. This voltage is chosen to be some DC value less than the aforementioned nominal DC level. Similarly, comparator 252 is also responsive to a selectable reference voltage appearing on line 256. This selectable reference voltage is chosen to be some DC value above the aforementioned nominal DC level. When the signals received by the two active antennas are in phase or when their phase difference is less than some predetermined level, the amplitude of the phase (+) signal will be intermediate to the voltage level appearing on lines 254 and 256. Under these circumstance with the comparator input polarities connected as shown in FIG. 14, the output signals provided by both of these comparators will be in the high state. This results in a low level logic signal at the output of NAND gate 258 which in turn insures that the logic signal appearing on line 248 will remain in the high state and permit the output signal of voltage controlled oscillator 246 to be coupled through NAND gate 240. If, however, the amplitude of the phase (+) signal falls below the amplitude of the signal on line 254 or becomes larger than the amplitude of the signal appearing on line 256 (as it will when the phase difference between the two received signals becomes large) then the output signal generated by one of comparators 250 and 252 will switch to the low state. This results in a high level logic signal appearing on line 260, which in turn gates the signal generated by astable multivibrator 262 through NAND gate 264. Astable multivibrator 262 provides an output square wave having a period in the range one-quarter to one-half second. This low frequency square wave appearing on line 248 acts as a periodic gating function to NAND gate 240. The end result is that the audible tone produced by speaker 152 becomes intermittent to warn an operator that the vector to the transmitter has departed from the receiver axis by more than a preselected threshold.

The phase (+) signal is also compared with the phase (−) signal in comparator 266. The output of comparator 266 provides one input to NAND gate 268 and, after inversion by inverter 270, provides an input to NAND gate 272. NAND gates 268 and 272 are enabled when the signal appearing on line 274 is in the high state indicating a transmitter signal has exceeded a threshold of comparator 238. The third input to NAND gates 268 and 272 is a voltage reference level established by resistor R99, capacitor C112 and zener diode VR4 when these components are electrically connected to a DC supply voltage by the closure of switch 30. Switch 30 is the front/rear switch located on the front panel of the display unit as shown in FIG. 2. Depending on the relative amplitude of the phase (+) signal and phase (−) signal the output of one of NAND gates 268 and 272 will be in the high state while the output of the other will be in the low state. If, for example, the output of NAND gate 268 is in the low state then the output of inverter 274 will be in the high state and will enable light driver 278 to energize "front" lamp 32 to indicate to an operator that the transmitter being detected is located in front of the receiver. When the opposite situation exists "rear" lamp 34 will be illuminated.

There has been disclosed a beacon tracking system which enables police officials or the like to track items which have been subject to unauthorized removal from their designated storage locations. The system includes a transmitter which is secreted within the item subjected to unauthorized removal and which is switched to a transmitting state by the act of removal. The system further includes a receiver which, in one application, may be located in a police cruiser. The receiver processes the amplitudes and the relative phases of the transmitted signals as detected by receiving antennas to determine the distance and direction to the transmitter. The system also includes display means for conveniently portraying the information to an operator both visually and audibly. While the preferred embodiment of the invention has been disclosed there may be suggested to those skilled in the art minor modifications which do not depart from the spirit and scope of the invention as set forth in the appended claims.

What is claimed is:
1. A single site beam tracking system comprising:
 a. an article having a concealed compartment;
 b. a miniature electromagnetic energy transmitter within the concealed compartment of the article, said transmitter including:
   i. an oscillator having a frequency stabilizing means for providing a selected frequency stability;
   ii. a frequency multiplier coupled to the oscillator for generating a higher harmonic of the oscillator frequency for signal discrimination in a noise environment;
   iii. a switch; and
   iv. a source of electrical power, said switch connected between the source of power and oscillator for controlling transmitter operation;
 c. a storage means including a switch activator, said article stored within the storage means with the transmitter switch in operative association with the switch activator for maintaining the transmitter switch in an off position while the article is within the storage means;
 d. a receiver means including first and second antennas mounted upon a vehicle in a selectively spaced relationship along a transverse axis thereof, a phase comparison circuit selectively coupled to the first and second antenna for comparing the phases of the signals received by said first and second anten- nas to determine the direction to said transmitter, and a signal amplitude measuring means connected to the phase comparison circuit for determining distance from receiver to transmitter; and e. a display means including a direction indicator and a distance indicator for providing direction and distance information locating the transmitter bearing article.

2. A beacon tracking system comprising:
a. an article having a concealed compartment;
b. a miniature electromagnetic energy transmitter within the concealed compartment of the article, said transmitter including:
   i. an oscillator having a frequency stabilizing means for providing a selected frequency stability,
   ii. a frequency multiplier coupled to the oscillator for generating a higher harmonic of the oscillator frequency for signal discrimination in a noise environment,
   iii. a switch, and
   iv. a source of electrical power, said switch connected between the source of power and oscillator for controlling transmitter operation;
c. a storage means including a switch activator, said article stored within the storage means with the transmitter switch in operative association with the switch activator for maintaining the transmitter switch in an off position while the article is within the storage means;
d. an electromagnetic energy receiver having:
   i. first and second antennas mounted upon a vehicle in a selectively spaced relationship along a transverse axis thereof;
   ii. first and second conversion channels connected respectively, to the first and second antennas, said conversion channels each having a plurality of converter stages for reducing the received frequency to a frequency substantially that for obtaining maximum phase difference accuracy and an AGC feedback circuit for increasing the dynamic range of input signals;
   iii. detector means connected to the first conversion channel for detecting the presence of the transmitted signal; and
   iv. a phase detector means connected to the outputs of the first and second conversion channels for comparing received signals to determine the phase difference of the transmitted signals received by the first and second antennas; and
e. a display unit including:
   i. an indicator for indicating the presence of the transmitted signal,
   ii. a direction meter connected to the phase detector for indicating the side of the vehicle to which the antenna is located; and
   iii. a distance indicator connected to the AGC circuit for indicating the distance to the transmitter responsively to the amplitude of the AGC signals, whereby the vehicle provides the operator a single site for beacon tracking.

3. A single site beacon tracking system comprising:
a. an article having a concealed compartment;
b. a minature radio transmitter compartment of the article, said transmitter including:
   i. an oscillator having a frequency stability means for providing a selected frequency stability,
   ii. a frequency multiplier coupled to the oscillator for generating a higher harmonic of the oscillator frequency for transmission,
   iii. a modulator for modulating the carrier signal with a transmitter identifying frequency signal,
   iv. a switch, and
   v. a source of electrical power, said switch connected between the source of power and oscillator for controlling transmitter operation;
c. a storage means including a switch activator, said article stored within the storage means with the transmitter switch in operative association with the switch activator for maintaining the transmitter switch in an off position while the article is within the storage means;
d. an RF receiver having:
   i. first, second and third antennas mounted upon a self propelled vehicle, the antennas forming the corners of a right triangle whose legs have a length less than one-half the wavelength at the carrier frequency of the transmitter, the first antenna being positioned at the intersection of a longitudinal axis and a transverse axis of the self propelled vehicle with the second and the third antennas being positoned, repectively, on the corresponding transverse and longitudinal axes of the vehicle,
   ii. a switching means connected to the second and third antennas,
   iii. a first triple conversion channel connected to the first antenna and a second triple conversion channel connected to the switching means of the second and third antennas, the switching means operative to connect selectively the second and third antennas to the second triple conversion channel, said first and second triple conversion channels including first, second and third converter stages for reducing the received frequency to a frequency substantially that for obtaining maximum phase difference accuracy and an AGC feedback circuit coupling the output of the second amplifier stage back to the first amplifier for increasing the dynamic range of input signals,
   iv. an alarm detector coupled to the output of the second stage amplifier of the first triple conversion channel for detecting the presence of the transmitter identifying frequency signal in any incoming signal,
   v. a phase detector coupled to the outputs of the first and second triple conversion channels for producing an analog signal having an amplitude proportional to the phase difference of the transmitted signals received, and
   vi. a large angle detector coupled to said phase detector for producing, above a selected threshold, an on/off gating signal; and
e. a display unit including:
   i. a switch selector coupled to the second and third antenna selector switch for switching the second triple conversion circuit from the second antenna to the third antenna;
   ii. a direction meter including first and second circuits connected to the phase detector, said direction meter when the second antenna is connected to the second triple conversion channel having its first circuit connected to the detector for the meter to indicate the side of the vehicle to which the transmitter is located and when the third antenna is connected to the second triple conversion channel having its second circuit connected to the detector for indicating the end of the vehicle to which the transmitter is located, iii. a front/rear lamp assembly including front and rear lamps connected to the phase detector and operative responsively to the third antenna input to light, selectively, the front and rear lamps to indicate whether the transmitter is in front of or behind the vehicle, iv. a tone generator having input terminals connected to the AGC feedback circuit, alarm detector and large angle detector, the alarm detector activating the tone generator responsive to the presence of a signal having the transmitter identifying frequency, the amplitude of the AGC signal varying the frequency of the output of the tone generator to provide an audible tone indicating distance to the tramsmitter, and the large angle detector providing a gating signal to gate the tone generator on and off in a periodic fashion to indicate that a turn of the self propelled vehicle is required to track the transmitter, v. a speaker connected to the output of the tone generator to produce sound waves indicative of the tone generator output, and vi. a distance indicator connected to the AGC feedback circuit for visually indicating the distance to the transmitter responsively to the amplitude of the AGC signals.

4. A method for indicating removal of an item from its proper repository and for locating said item after said removal, said method comprising the steps of:

a. secreting a radio frequency energy transmitter in an item;

b. activating the radio frequency energy trasmitter in response to removal of the item to transmit transmitter identifying signals;

c. receiving said radio frequency energy at a pair of antennas selectively mounted on a vehicle in a spaced relationship at less than about one-half wavelength of a carrier frequency of the transmitted radio frequency energy;

d. processing received radio frequency energy to detect the presence of the transmitted RF energy and to determine the phase of the radio frequency received at each of the pair of antennas and the amplitude of the radio frequency energy received at one of the pair of antennas;

e. comparing the phases of the transmitted radio frequency energy received by the antennas for determining the phase difference thereof; and f. converting the phase difference signal and the amplitude of the RF energy received by one of the antennas, respectively, to direction and distance receivable signals for location of the transmitter by the operator of the vehicle.

* * * * *